United States Patent Office 2,789,918
Patented Apr. 23, 1957

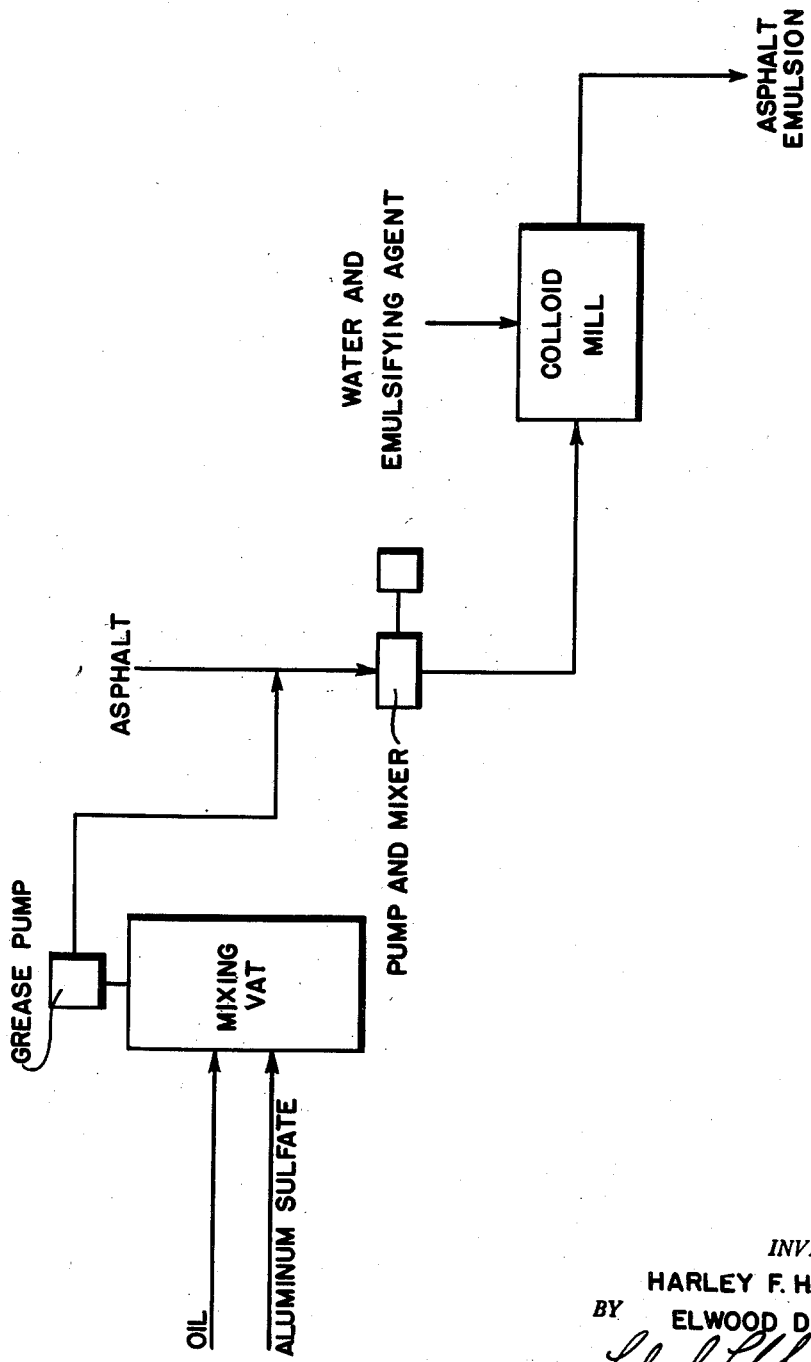

2,789,918
METHOD OF PREPARING ASPHALT EMULSIONS CONTAINING ALUMINUM SULFATE

Harley F. Hardman, Lyndhurst, and Elwood D. Wells, Lakewood, Ohio, assignors to The Standard Oil Company, Cleveland, Ohio, a corporation of Ohio Application July 12, 1954, Serial No. 442,602

4 Claims. (Cl. 106—277)

The present invention relates to a method of preparing an asphalt emulsion containing aluminum sulfate in the asphalt phase of the emulsion.

In a copending application Serial No. 374,608, filed August 17, 1953, in which one of us is a joint inventor, an asphalt emulsion is described containing aluminum sulfate in the asphalt phase of the emulsion. Our invention relates particularly to an improved process of making asphalt emulsions of this type.

While the advantages of employing aluminum sulfate in the asphalt phase of an emulsion have been shown in said copending application, the disclosure of which is incorporated by reference, it has been a vexing problem to find a method, which is commercially applicable, of introducing the aluminum sulfate into the asphalt. Aluminum sulfate, being an inorganic solid, is not soluble in the asphalt. Because of the solubility of aluminum sulfate in water, it appeared that the most economical method of incorporating the aluminum sulfate in the asphalt would be by means of an aqueous solution of the aluminum sulfate. However, such a process requires careful control, especially as applied to an emulsion of the rapid setting type.

Accordingly, it is the object of this invention to provide an improved method for the manufacture of asphalt emulsions which contain aluminum sulfate in the asphalt phase, and in particular to provide an improved method of introducing the aluminum sulfate into the asphalt.

It is the further object of this invention to provide a method for the manufacture of asphalt emulsions of the rapid setting type containing aluminum sulfate in the asphalt phase.

We have discovered a process by means of which aluminum sulfate can be introduced into the asphalt in a manner which will provide an emulsion having excellent stability, particularly in the case of the rapid setting type of emulsion, and which can be performed readily and simply to give uniform results.

The method of this invention comprises the mixing of a finely divided aluminum sulfate solid in a medium in which the aluminum sulfate is insoluble but which is compatible with asphalt so as to give a slurry of aluminum sulfate having a grease-like consistency. Generally, a hydrocarbon stock such as an oil or residuum will be used because of economic considerations. This grease-like slurry is added to the asphalt and can be mixed therewith without any difficulty. The invention will be further understood from the schematic drawing which illustrates a preferred embodiment of the invention and which is self-explanatory.

The aluminum sulfate used in our process may be the ordinary aluminum sulfate $Al_2(SO_4)_3$. Any of the various hydrates of $Al_2(SO_4)_3$ may be employed in the process of the invention, and the term "aluminum sulfate" is intended to include anhydrous aluminum sulfate, all of the hydrates thereof, and any basic aluminum sulfate which may be present as in said copending application.

The size of the aluminum sulfate particles employed in this mixture is important in order to prevent the agglomeration of aluminum sulfate in the asphalt. The aluminum sulfate may have any degree of fineness but preferably should not exceed a size that will conveniently pass through a 100 mesh screen. A particle size of less than 300 mesh would be even more desirable, but the 100 mesh size is commercially available and will produce a satisfactory mixture.

The medium employed as a carrier for the aluminum sulfate should have a viscosity in the range from about 300 to 10,000 SSU at 100° F. If too light a medium is used, the particles of aluminum sulfate will tend to settle out, leading to clogging of both pipes and pumps which are used to transport the mixture. Any medium meeting this viscosity requirement can be used, such as hydrocarbon, animal and vegetable oils, liquid polymers, etc., that are compatible with asphalt. It is also important that a minimum amount of medium be used in the preparation of the aluminum sulfate slurry, as otherwise the properties of the asphalt will be adversely affected. For instance, if too much of the medium is employed, the penetration of the asphalt will be increased by an undesirable amount so as to render it unsuitable for the paving of roads.

The pulverized aluminum sulfate is mixed in a mixing vat with the medium. Surface active agents may be added to the slurry to assist in the dispersion of the aluminum sulfate particles in the medium, but such agents are not required. Because of the importance of using a viscous medium, it may be desirable to heat the medium slightly during the mixing step in order to insure the distribution of the aluminum sulfate therein. The use of heat will depend on the viscosity of the medium. However, if heat is employed to assist in the mixing, it is preferred that the temperature be below the temperature at which the water of crystallization of the aluminum sulfate will be separated from a hydrated aluminum sulfate, if a hydrate is used, and if it is desired not to alter the character of the sulfate selected. The mixture is stirred constantly while the aluminum sulfate is being added in order to provide a slurry of uniform consistency.

The mixture resulting from the addition of the aluminum sulfate to the medium is a heavy viscous liquid having the consistency of a grease. This mixture is then injected by any suitable means, such as a grease pump, into the asphalt in which it is uniformly distributed, such as by a pump in the asphalt line. The asphalt containing the aluminum sulfate is then emulsified with water in the usual manner. Any emulsifier known in the art can be used in the preparation of emulsions according to the method of this invention, and this aspect of the invention is not critical.

The amount of the aluminum sulfate added to the asphalt is 0.05 to 2%, preferably about 0.1 to 0.5%, on the asphalt phase as described in the copending application. The aluminum sulfate may constitute from 25 to 75% of the slurry, and it can be seen that the amount of the slurry added to the asphalt will be 0.13 to 2% by weight based on the asphalt. Preferably, the amount will be in the range of 0.2 to 1% by weight.

As an example of this invention, a 10,000 gallon batch of a rapid setting asphalt emulsion was prepared in the following manner. Two hundred fifty pounds of aluminum sulfate, having a particle size such that at least 95% of the particles would pass through a 100 mesh screen, was slowly mixed into 250 lbs. of cylinder stock (a hydrocarbon oil having a viscosity of 200 SSU at 250° F.). The resultant grease-like slurry was then mixed into asphalt in the ratio of 500 lbs. of slurry to 7100 gallons of asphalt. The asphalt which contained the aluminum sulfate was then emulsified in a colloid mill with water which contained 2% of sodium tallate as an emulsifier and 0.4% of sodium hydroxide. The emulsion had an asphalt content of 71%. The emulsion produced by this method had an adhesion of 75%, as measured by the method outlined in the Ohio Asphalt Specification M-205.5, and satisfactory stability, demulsibility, viscosity, and other characteristics.

The invention has been described as applied to a rapid setting emulsion because these are the most difficult to make. It can be applied to the medium and slow setting emulsions as will be obvious to one skilled in the art in view of the disclosure herein.

While modifications of this invention will occur to those skilled in the art, it is not deemed to be limited except as stated in the appended claims.

We claim:

1. A method of preparing an asphalt emulsion having improved adhesion and other requisite properties comprising the steps of slurrying aluminum sulfate in a liquid hydrocarbon having a viscosity of at least about 300 SSU at 100 F. which is compatible with asphalt, mixing the resultant slurry with asphalt, and then emulsifying said asphalt with an aqueous solution containing an emulsifying agent.

2. A method of preparing an asphalt emulsion having improved adhesion and other requisite properties comprising the steps of slurrying aluminum sulfate particles of a size such that about 95% will pass through a 100 mesh screen in a liquid hydrocarbon having a viscosity in the range of about 300 to 10,000 SSU at 100° F. so as to form a slurry having the consistency of grease, mixing said slurry with asphalt in a liquid state, and then emulsifying said asphalt with an aqueous solution containing an emulsifying agent.

3. The method of claim 2 in which the slurry-forming liquid medium is cylinder stock.

4. The method of claim 1 in which the slurry produced comprises an amount of aluminum sulfate in the range of 25 to 75 percent of the slurry, and in which the amount of the slurry added to the asphalt is in the range of 0.13 to 2 percent.

References Cited in the file of this patent

UNITED STATES PATENTS

| | | |
|---|---|---|
| 2,376,447 | Mullin | May 22, 1945 |
| 2,412,545 | Watts | Dec. 10, 1946 |
| 2,585,336 | McCoy | Feb. 12, 1952 |
| 2,602,029 | Bradshaw | July 1, 1952 |
| 2,670,304 | McCoy | Feb. 23, 1954 |